(12) United States Patent
Reynolds et al.

(10) Patent No.: US 7,020,888 B2
(45) Date of Patent: Mar. 28, 2006

(54) SYSTEM AND METHOD FOR PROVIDING AN OMNIMEDIA PACKAGE

(75) Inventors: Steven Reynolds, Littleton, CO (US); Joel Hassell, Golden, CO (US); Thomas Lemmons, Evergreen, CO (US); Ian Zenoni, Highlands Ranch, CO (US)

(73) Assignee: Intellocity USA, Inc., San Francisco, CA (US)

( * ) Notice: Subject to any disclaimer, the term of this patent is extended or adjusted under 35 U.S.C. 154(b) by 377 days.

(21) Appl. No.: 09/996,068

(22) Filed: Nov. 27, 2001

(65) Prior Publication Data

US 2002/0138852 A1 Sep. 26, 2002

Related U.S. Application Data

(60) Provisional application No. 60/253,168, filed on Nov. 27, 2000.

(51) Int. Cl.
*H04N 7/025* (2006.01)

(52) U.S. Cl. ................ 725/34; 725/67; 725/114; 725/116; 725/138; 725/144; 725/146; 370/486; 370/487; 709/246; 709/230; 709/231; 709/219

(58) Field of Classification Search .......... 725/46, 725/61, 131, 139, 151; 370/486–487; 709/246, 709/230, 231, 219
See application file for complete search history.

(56) References Cited

U.S. PATENT DOCUMENTS

| | | | | |
|---|---|---|---|---|
| 5,444,707 A | * | 8/1995 | Cerna et al. ............... 370/389 |
| 5,559,549 A | * | 9/1996 | Hendricks et al. ........... 725/50 |
| 5,583,576 A | * | 12/1996 | Perlman et al. ............. 725/28 |
| 5,600,573 A | * | 2/1997 | Hendricks et al. .......... 725/109 |
| 5,650,827 A | | 7/1997 | Tsumori et al. ............ 348/565 |
| 5,659,350 A | * | 8/1997 | Hendricks et al. .......... 725/116 |

(Continued)

FOREIGN PATENT DOCUMENTS

EP        1003304        5/2000

(Continued)

OTHER PUBLICATIONS

"1st report of EBU/SMPTE task force for harmonized standards for the exchange of television program material as bit streams," *EBU Review Technical, European Broadcasting Union*, Brussels, BE, No. 272, Jun. 21, 1997, pp. 1-73, XP000720137, ISSN: 0251-0936.

(Continued)

*Primary Examiner*—John Miller
*Assistant Examiner*—Jason Salce
(74) *Attorney, Agent, or Firm*—Morrison & Foerster LLP

(57) ABSTRACT

Disclosed is a system that permits a variable number of disparate streams of data to be packaged together as content into a single distinct program referred to as an omnimedia package. A framework definition may be specified and created for the omnimedia package to allow a client set top box to decode the information and provide access to streams comprising video, audio and metadata information. The framework definition may be employed by a broadcast system to create a broadcast stream. A mechanism is described that permits a content provider to define a framework for delivering a package of related content. The framework definition encapsulates information necessary to build, format, transmit and display the disparate content streams. Data may be downloaded to a receiver prior to the broadcast of an associated program. The present invention may be implemented on terrestrial, cable, satellite, VDSL and other transport systems, including those that support upstream communication.

5 Claims, 5 Drawing Sheets

U.S. PATENT DOCUMENTS

| | | | | |
|---|---|---|---|---|
| 5,666,293 | A * | 9/1997 | Metz et al. | 709/220 |
| 5,745,758 | A * | 4/1998 | Shaw et al. | 718/102 |
| 5,801,788 | A | 9/1998 | Ashida et al. | 348/564 |
| 5,883,677 | A | 3/1999 | Hofmann | 348/6 |
| 5,892,915 | A * | 4/1999 | Duso et al. | 709/219 |
| 5,894,320 | A | 4/1999 | Vancelette | 348/6 |
| 5,900,916 | A | 5/1999 | Pauley | 348/564 |
| 5,956,076 | A * | 9/1999 | Hoess | 725/118 |
| 5,973,748 | A | 10/1999 | Horiguchi et al. | 348/461 |
| 6,211,869 | B1 * | 4/2001 | Loveman et al. | 345/723 |
| 6,229,575 | B1 | 5/2001 | Vaughan et al. | 345/115 |
| 6,236,395 | B1 * | 5/2001 | Sezan et al. | 345/723 |
| 6,253,207 | B1 | 6/2001 | Malek et al. | 707/104 |
| 6,275,267 | B1 | 8/2001 | Kobayashi | 348/555 |
| 6,295,646 | B1 | 9/2001 | Goldschmidt Iki et al. | 348/326 |
| 6,408,437 | B1 * | 6/2002 | Hendricks et al. | 725/132 |
| 6,411,724 | B1 * | 6/2002 | Vaithilingam et al. | 382/100 |
| 6,463,585 | B1 * | 10/2002 | Hendricks et al. | 725/35 |
| 6,470,378 | B1 * | 10/2002 | Tracton et al. | 709/203 |
| 6,487,723 | B1 * | 11/2002 | MacInnis | 725/132 |
| 6,490,320 | B1 * | 12/2002 | Vetro et al. | 375/240.08 |
| 6,490,370 | B1 * | 12/2002 | Krasinski et al. | 382/195 |
| 6,536,041 | B1 * | 3/2003 | Knudson et al. | 725/39 |
| 6,539,548 | B1 * | 3/2003 | Hendricks et al. | 725/109 |
| 6,549,922 | B1 * | 4/2003 | Srivastava et al. | 707/205 |
| 6,557,172 | B1 * | 4/2003 | Carr | 725/139 |
| 6,564,263 | B1 * | 5/2003 | Bergman et al. | 709/231 |
| 6,567,980 | B1 * | 5/2003 | Jain et al. | 725/61 |
| 6,574,417 | B1 * | 6/2003 | Lin et al. | 386/70 |
| 6,594,699 | B1 * | 7/2003 | Sahai et al. | 709/228 |
| 6,694,336 | B1 * | 2/2004 | Multer et al. | 707/201 |
| 2002/0073434 | A1 * | 6/2002 | Pience | 725/119 |

FOREIGN PATENT DOCUMENTS

| | | |
|---|---|---|
| WO | WO-0229602 A1 * | 4/2002 |
| WO | WO-0242864 A2 * | 5/2002 |

OTHER PUBLICATIONS

"Systems—compression issues—wrappers and metadata—networks and transfer protocols," Final report of the EBU/SMPTE task force for the exchange of television program material as bit streams, Online!, Aug. 5, 1998, pp 7-87, XP002201576, Retrieved from the Internet on May 29, 2002: URL:http://www.ebu.ch/pmc_tfrep_part_4.pdf.

Mohan, R, et al: "Adapting multimedia Internet content for universal access," *IEEE transactions on multimedia*, IEEE service center, Piscataway, NJ, US vol. 1, NR. 1, pp. 104-114, XP002159629, ISSN:1520-9210.

Kuhn, P, et al: "Report on the CE on the transcoding hint DS," ISO/IEC JTC1/SC29/WG11 MPEG2000/M6002 XX, XX, May 2000, pp. 1-43, XP001001466.

Heuer, J; Casa, J.L.; Kaup, A.: "Adaptive multimedia messaging based on MPEG-7—The M3-box," *Proc. second int'l symposium on mobile multimedia systems & applications*, Online!—Nov. 10, 2000, pp. 6-13, XP002201575 Delf, retrieved from the internet: <URL:http//www.lnt.de/{kaup/paper/mmsa-2000.pdf.> retrieved on May 29, 2002, the whole document.

PCT search report from Lads & Parry, Jun. 21, 2002.

* cited by examiner

SYSTEM AND METHOD FOR PROVIDING AN OMNIMEDIA PACKAGE

CROSS REFERENCE TO RELATED APPLICATIONS

This application claims the benefit of U.S. patent application Ser. No. 60/253,168 entitled 'OmniMedia Package", filed Nov. 27, 2000 by Steven Reynolds, which is also specifically incorporated herein by reference for all that it discloses and teaches.

BACKGROUND OF THE INVENTION a. Field of the Invention

The present invention relates to enhanced multimedia television and more particularly to a system and method for organization, combination, transmission and reception of media from a range of sources wherein the media may comprise a plurality of video streams, audio streams, and other information, such as may be accessed via the Internet.

b. Description of the Background

The format of television programs often conforms to NTSC, PAL, or SECAM standards wherein a predefined bandwidth, i.e. channel, is employed to carry a single television program. Additional information that may be provided with a program has often been encoded into the vertical blanking interval (VBI), such as closed captioning or alternate language support, for example. As television broadcast formats move to digital transmission, many programs continue to be presented in a manner similar to 'channel' based television, comprising one video stream, a primary audio stream, and possibly an alternate audio stream.

Continued expansion of the Internet and high bandwidth networks provides access to an increasing volume of information. Adoption of digital transmission formats allows media such as audio, video, and metadata content, to be associated, combined, and presented to provide viewers with a richer and more diverse media experience. Methods such as MPEG7 provide for relating content information, but do not provide a method by which content of various formats may be grouped, transmitted and displayed. Therefore a new method of organizing, transmitting, and presenting media from multiple sources is needed.

SUMMARY OF THE INVENTION

The present invention overcomes the disadvantages and limitations of the prior art by providing a system and method that allows a transmission system to organize and transmit a related set of media and for a display platform to organize and render related media information in a manner that reflects the available media and the capabilities of the platform. A framework definition identifies a set of associated content (media) for a broadcast program. The present invention compares the format of the media with a transmission format and converts media of other formats to that of the transmission format. An omnimenu describes the content. Media content and the omnimenu are combined into a broadcast stream and transmitted.

The present invention may therefore comprise a method for producing a broadcast stream that contains audio content, video content, and metadata content comprising: creating a framework definition that identifies the audio content, the video content and the metadata content associated with a broadcast and attributes thereof, comparing the audio format of the audio content with an audio transmission format and converting the audio content to the audio transmission format if the audio format and the audio transmission format differ, comparing the video format of the video content with a video transmission format and converting the video content to the video transmission format if the video format and the video transmission format differ, comparing the metadata format of the metadata content with a metadata transmission format and converting the metadata content to the metadata transmission format if the metadata format and the metadata transmission format differ, creating a menu describing the audio content, the video content, and the metadata content, combining the audio content, the video content, and the metadata content into a broadcast stream, transmitting the menu; and transmitting the broadcast stream.

A framework controller may utilize the framework definition to access media content, to process and format the media content and to control packaging and multiplexing of the content for broadcast.

The present invention may further comprise a system for combining multiple media and metadata streams having content into a framework for distribution of the content to a viewer comprising: at least one video source having an output, at least one audio source having an output, at least one metadata source having an output, a framework controller that receives the video source, audio source, and metadata source and produces an omnimedia package integrating the outputs into a framework, a framework definition module that interfaces with the framework controller and defines all content to be used in the omnimedia package, a delivery module that receives the omnimedia package from the framework controller and transmits the omnimedia package to a receiver, and a receiver that receives and distributes the content of the omnimedia package to display devices and audio outputs, the receiver further coupled to at least one user input device that provides interactivity between the viewer and the receiver.

The present invention may utilize pre-loaded content that is transferred to a receiver prior to the broadcast of a media stream with which the preloaded content is associated. Pre-loaded content allows voluminous and complex content to be employed during a broadcast without requiring bandwidth to transfer the pre-loaded content at the time of broadcast and without latencies that may be incurred if the pre-loaded content were transferred at the time of broadcast.

The present invention may additionally comprise a method for rendering portions of a broadcast stream that contains audio content, video content, and metadata content and a menu indicating the contents of the audio content, video content, and metadata content comprising: transferring preloaded metadata associated with the broadcast stream to a receiver prior to transmission of the broadcast stream, receiving the broadcast stream, displaying the menu wherein the menu includes an icon representing the pre-loaded metadata, receiving a user input, and rendering the preloaded metadata in response to the user input.

Advantageously, the present invention allows a viewer to select among a plurality of audio, video and metadata sources to obtain a television presentation tailored to the viewer's preferences, offering increased viewing satisfaction. The present invention may be employed utilizing the capabilities of emerging digital transmission formats to provide an enhanced viewing experience and to increase audience size, allowing increased advertising revenue.

DESCRIPTION OF THE FIGURES

In the figures.

DETAILED DESCRIPTION OF THE INVENTION

The present invention is directed to allowing the creation of larger, more robust productions with support for interactivity and multiple video, audio, and data streams. A framework definition provides organization of media for transmission, and for rendering of media by a display platform that may comprise a television, interactive television, set-top box, satellite receiver, personal computer or other operable to receive data across a network or airwave and process data according to the method of the present invention. The framework definition allows a media stream or multiple media streams to be packaged together with other content into a single distinct program, hereinafter referred to as an omnimedia package. A content provider may employ the framework definition to specify and deliver a package of related content, encapsulating the information necessary to build, format, transmit and display the content. Content may comprise video, audio, and data information that may be streamed or cached. A wide range of information types and formats may be employed as illustrated by table 1. The present invention is not limited to any specific types of information, formats, or relationships between information.

TABLE 1

| Media Type | Format |
| --- | --- |
| CBR and VBR encoded video streams | MPEG, DVB, etc |
| Encoded Audio Streams | MP2, MP3 |
| Packet-based encoded video/audio streams | QuickTime, AVI, etc |
| Program Synchronous Metadata | ATVEF, Java, etc |
| Scripted content | HTML, Java, JavaScript, ECMAscript, VBScript, etc |
| Interactive Graphical User Interface | HTML, CSS 1, DOM 0 |
| Graphical Elements | Logos, still-frame images, JPEG, GIF, etc |

The present invention may be employed with broadcast systems that utilize terrestrial, cable, satellite, VDSL, or other transport methods. The present invention may also be employed with systems in which content is requested via a reverse path and with systems that support local or client side storage of pre-delivered content. Digital format transmission systems are well suited to the method of the present invention, but analog systems with VBI data and Internet connection may also be employed.

Figure 1:
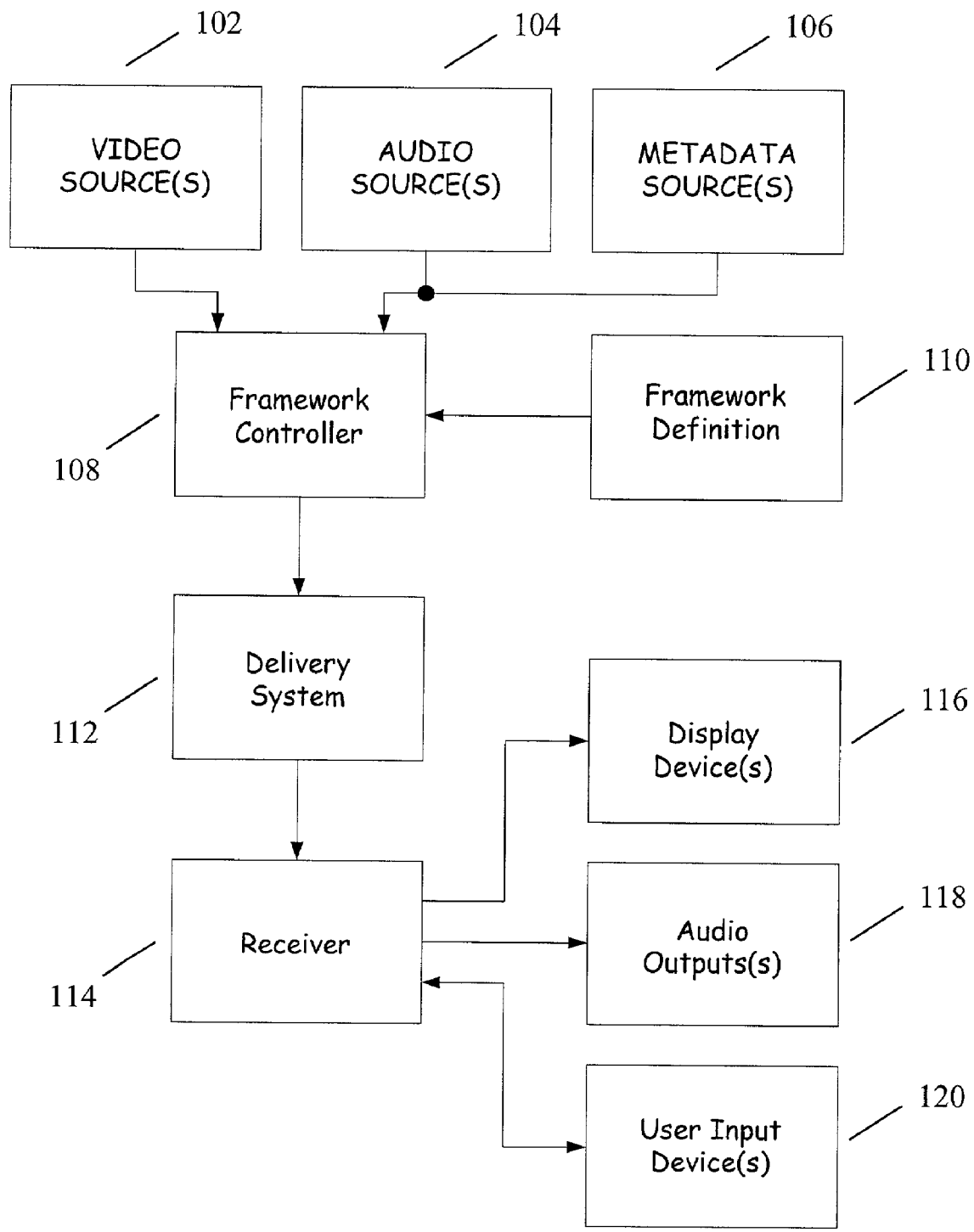
FIG. 1 is a high-level block diagram of the present invention.

FIG. 1 is a high-level block diagram of the present invention. A plurality of audio/visual and metadata sources, which provide the audio, video, metadata and other data services, are combined to produce an omnimedia package. The term omnimedia describes the inclusive nature of the content being delivered by the present invention, as contrasted with the usual audio/video packaging associated with television events. Thus, for a given event, the omnimedia package represents all of the synchronous and asynchronous components from video source(s) 102, audio source(s) 104, and metadata sources 106, which may comprise and may be associated with a primary broadcast. Video source(s) 102 may comprise standard television broadcast channels (analog or digital modulation and encoding), any form of analog video (for example, Beta and VHS format tapes), any form of stored digital video (for example, Laserdisc, DVD or any server-based digital video, such as may be used by video-on-demand systems) or may be any form of packet-based streaming media. This may include alternate camera sources, supporting video, alternate advertising video, localized or regionalized video. Audio source(s) 104 may comprise soundtracks that accompany one or more video source(s) 102, or may comprise an independent stream such as a radio signal or other audio only broadcast. Framework definition 110 defines the relationships between different content streams. For video source(s) 102 there may be zero, one or several associated audio source(s) 104. Further, a given audio source 104 may be assigned to zero, one or more video source(s) 102. There is no requirement that any given video source 102 have an accompanying audio source 104. Audio may be encoded with a video source, such as may be practiced with packet-based streaming media. Metadata source(s) 106 may contain data packaged with respect to an event or associated with a general subject and may include executable code, scripts, graphics, logos, or general data. Metadata may be time synchronized, content related, or ancillary to an event.

Following are three examples illustrating the types and relationships between video source(s) 102, audio source(s) 104, and metadata source(s) 106, and how these sources may be organized and associated to provide a richer media presentation. In Example One, an omnimedia program is provided for the French Open, a tennis tournament featuring several simultaneous events. The primary broadcast may be from the main (or center) court with accompanying broadcasts from other venues.

EXAMPLE ONE

| Source ID | Source Type | Source Description |
| --- | --- | --- |
| 102.1.A | High bit rate video stream intended for full screen video. | Video feed from center court, featuring players A and B. This is the Primary Video to be broadcast. This is the video that is broadcast to non-omnimedia enabled television systems. |
| 104.1.A | Audio Track | This is the English audio track for 102.1.A. |
| 104.1.B | Audio Track | This is the French audio track for 102.1.A. |
| 102.1.B | Low bit rate video stream intended for scaled video window. | Camera focused on player A's coach and family members. |
| 102.1.C | Low bit rate video stream intended for scaled video window. | Camera focused on player B's coach and family members. |
| 102.1.D | Medium bit rate video stream. | Alternate camera angle 1 from behind player A. |
| 102.1.E | Medium bit rate video stream. | Alternate camera angle 2 from behind player B. |
| 102.1.F | Medium bit rate video stream. | Video feed from court 2, featuring players C and D. |
| 104.1.C | Audio Track | This is the English audio track for 102.1.F. |
| 104.1.D | Audio Track | This is the French audio track for 102.1.F. |
| 102.1.G | Packet-based video stream with embedded audio track. | Video and audio feed from court 5, featuring a mixed doubles match between two poorly seeded pairs. |

-continued

| Source ID | Source Type | Source Description |
|---|---|---|
| 106.1.A | HTML Document | Interactive page that shows statistics for match in progress, tightly synchronized to 102.1.A. (video stream). |
| 106.1.B | HTML Document | Interactive page that shows summary of all matches in progress, loosely synchronized to 102.1.A, 102.1.B and 102.1.G (video streams). |
| 106.1.C | HTML Document | Interactive page that shows results of today's matches and contains links to upcoming matches (links navigate to 106.1.D and 106.1.E). |
| 106.1.D | HTML Document | Interactive page that provides detailed commentary for an earlier match |
| 106.1.E | HTML Document | Interactive page that shows statistics and commentary for upcoming match |
| 106.1.F | JPEG Image | Logo image to be used by Interactive pages (106.1.A–106.1.E). |

Example Two shows the components of an omnimedia package relating to the fourth day of the Masters, a major golf tournament.

EXAMPLE TWO

| Source ID | Source Type | Source Description |
|---|---|---|
| 102.2.A | High bit rate video stream intended for full screen video. | Video feed following, as appropriate and opportune, the various leaders. This is the Primary Video to be broadcast. This is the video that is broadcast to non-omnimedia enabled television systems. |
| 104.2.A | Audio Track | This is the audio track for 102.2.A. |
| 102.2.B | High bit rate video stream intended for full screen video | Video feed following Tiger Woods. |
| 104.2.B | Audio Track. | This is the audio track for 102.2.B. |
| 106.2.A | HTML Document | Interactive page showing Tiger Woods score card for the round in progress |
| 106.2.B | HTML Document | Interactive page showing leader board for tournament |
| 106.2.C | HTML Document | Interactive page showing past tournament winners |
| 106.2.D | Java Code | Executable code that instructs consumer device to show an animated view of the current hole in play on 102.2.A (loosely synchronized to 102.2.A) |

Example Three shows the components of an omnimedia package relating to a retransmission of the H. G. Wells "War of the Worlds" radio broadcast.

EXAMPLE THREE

| Source ID | Source Type | Source Description |
|---|---|---|
| 104.3.A | Audio Track | Audio feed of the original broadcast. This is the Primary Audio to be broadcast. This is the video that is broadcast to non-omnimedia enabled audio systems such as an automobile's radio. |
| 104.3.B | High Quality Audio Track. | This is an audio track that has been redubbed and digitally remastered with added stereo sound effects. |
| 102.3.A | High bit rate video stream intended for full screen video | Video feed of an interview with H. G. Wells about the making of and hysteria generated by the original broadcast. |
| 104.3.C | Audio Track. | This is the audio track for 102.3.A. |
| 106.3.A | HTML Document | Interactive page showing program synchronous factoids about the original broadcast of "War of the World". Tightly synchronized to 104.3.A. |
| 106.3.B | JPEG Image | Program synchronous images showing photos, artwork and press clippings related to 104.3.A. |

Framework definition 110 describes all content used in an omnimedia package. Framework controller 108 employs framework definition 110 to create an omnimedia package. Framework definition 110 defines the primary video and audio to be used by non-omnimedia aware platforms, plus initial audio and video for omnimedia package streams. Framework definition 110 is also employed to generate a main-menu/omnimenu. An omnimenu is an interactive user interface that presents a menu of options available with an omnimedia package. Options may comprise different video streams, different television layout, different audio sources, and other interactive data streams. The definition of each stream may include a start/stop time to enable framework controller 108 to switch streams during when creating the omnimedia package. An omnimenu may be presented in a range of formats and may be customized by the system operator. For example, one embodiment of an omnimenu may scale current video into an upper right-hand corner and display a list of options to the left of alternate video sources, alternate audio sources, and links to other data. Another embodiment of an omnimenu may employ a pre-defined TV layout comprising a ¾ screen primary video format and several secondary thumbnail videos and data indicators across the bottom of the screen.

Framework definition 110 may be created at a production facility or other site and may employ automated and manual methods of associating media. The framework definition 110 may reflect limitations and constraints of source delivery systems, transmission systems, and display platform limitations. Such limitations may include available bandwidth, number of channels tuned by a display platform, cache size, supported formats or other parameters. A framework definition may specify that images must be in GIF format and that HTML code must support version 3.23, for example. For each event or presentation, a framework definition record may be produced that may comprise information defining the type, size, nature, pricing, scheduling, and resource requirements for each media offered. Table 2 lists a number of components that may comprise a framework definition record.

TABLE 2

Framework Definition Record Components

Version of the omnimedia package
Onmimenu associated with the omnimedia package, may be created by framework controller.

TABLE 2-continued

Framework Definition Record Components

Parameters used by framework controller 108 to allocate, control and prioritize transmission of stream elements.
Flags/Category, languages, feature set, including multiple ratings available (e.g. PG thru R)
Parameters employed to control delivery. (Tuning, URL, etc...)
Price, if any: An associated cost for the omnimedia package
Time the omnimedia package expires
The number of framework definition stream records
A plurality of stream records A stream record is provided for each media source (audio, video, or metadata) to be offered in the omnimenu. Each framework definition stream record may comprise:
  a unique ID;
  a primary Y/N selection indicator;
  the media Type (audio/video/data/other);
  the bandwidth required for the media;
  a start time/date time;
  the date and time the omnimedia package expires;
  a description having a paragraph or two describing the data stream (by way of example, an audio stream could include the person speaking/band playing, a video stream could include the camera angle, or location, and a data stream could describe the interactive content and what it does. These are used by the framework controller 108 when building the omnimenu;
  a location (framework controller 108 would fill this out most likely) PID;
  flags category, languages, feature set, including multiple ratings available (e.g. PG thru R);
  price, including an associated cost for the stream as well as an additional fee beyond the cost of the program such that to see a certain rating version of a show or to see video instead of just hearing audio may require a premium payment;
  a unique Group ID within an Event that identifies a group of streams that are used by the framework controller 108 when building the omnimenu (note that only one stream from the group can be used at one time); and
  any Dependent Streams, each having a unique stream ID which is required to access/use the stream. In use, a stream may require another stream. These stream IDs may be used by the set top box to determine if the stream is available, i.e., an audio stream may be dependent on the video stream so that only devices that can view/use the video stream can access the audio stream. Also, the stream IDs can be used by head end equipment that is trying to optimize bandwidth and may want to separate different streams on different transponders for the same event.

An example of a framework definition is shown below:

```
<XML>
    <Version>4</Version>
    <Menu>Showme.html</Menu>
    <Flags>
        <Language>English</Language>
        <Rating>PG-13</Rating>
    </Flags>
    <Control> ???????? </Control>
    <Price>2.99</Price>
    <Expire>02/17/00 21:00</Expire>
```

-continued

```
    <StreamRecords>1</StreamRecords>
    <StreamRecord1>
        <ID>459812</ID>
        <Primary>True</Primary>
        <MediaType>Video</MediaType>
        <Bandwidth>256</Bandwidth>
        <Start>02/15/00 22:00</Start>
        <Expire>02/17/00 21:00</Expire>
        <Description></Description>
        <Location>PID:200</Location>
        <Flags>
            <Language>English</Language>
            <Rating>PG-13</Rating>
        </Flags>
        <Price>2.99</Price>
        <GroupID>002</GroupID>
        <Dependant>459810</Dependant>
    </StreamRecord1>
</XML>
```

Employing framework definition 110, the framework controller 108 is operable to format and organize media components into a stream or streams that may be delivered by the delivery system 112. Delivery system 112 may comprise a headend system and transmission apparatus such as employed by cable, satellite, terrestrial, and other broadcast systems. The organization and establishment of the stream(s) employs parameters provided in framework definition 110. The stream(s) is (are) delivered to receiver 114 that processes the stream(s) and provides output to display device(s) 116, audio output(s) 118, and may send and receive signals to/from user input device(s) 120.

Figure 2:
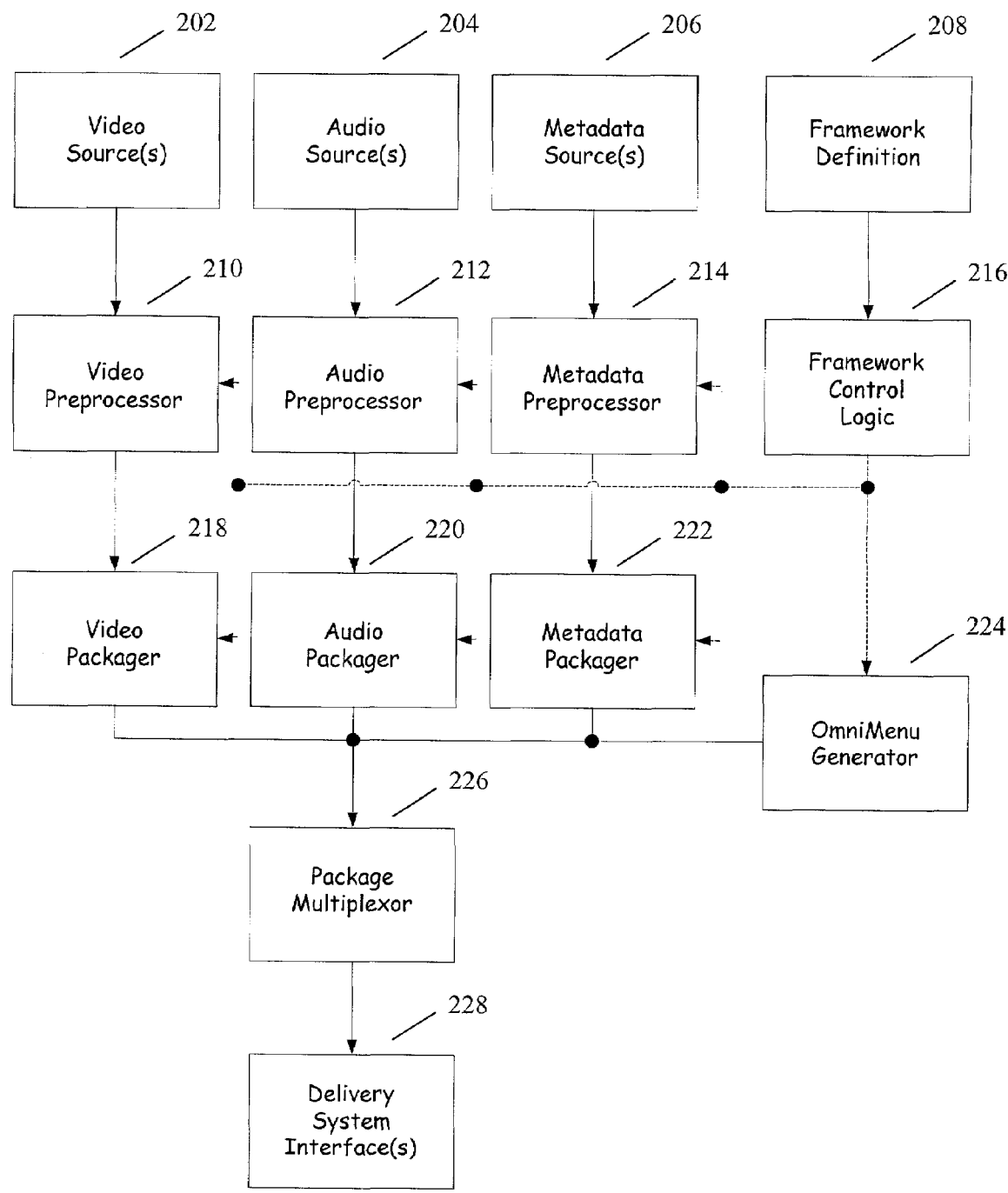
FIG. 2 depicts components of framework controller 108.

FIG. 2 depicts components of framework controller 108. Framework controller 108 includes framework control logic 216 that is operable to retrieve and interpret framework definition 110, and employ the parameters thereof to control operation preprocessors 210, 212, and 214, plus packagers 218, 220, and 222 to format and encapsulate information (video, audio and metadata) for multiplexer 226. Video preprocessor 210 and audio preprocessor 212 access media streams or stored data as specified by framework definition 110 and perform processing to prepare the media for the associated packager. Such processing may include rate adaptation, re-encoding, transcoding, format conversions, re-sampling, frame decimation, or other techniques and methods to generate a format and data rate suitable for packagers 218, 220, and 222 as may be specified by framework definition 110. Processing may include MPEG encoding of analog video as may be supported by encoder equipment from Divicom Inc. of Milpitas, Calif., which is a wholly owned subsidiary of C-Cube Microsystems, Inc. When such processing is specified, framework controller 108 may provide a sequence of instructions to the encoder, selecting channels and controlling encoding.

Metadata preprocessor 214 accesses metadata elements, specified by framework definition 110, and performs processing to prepare these the metadata packager 222. Such processing may include transcoding, format conversions, script conversions, script generation, and image format conversions, for example. In operation, graphical metadata may be sent to metadata preprocessor 214 in a computer graphics format (Photo Shop, for example) that then may be converted to a format that the display platform recognizes (gif, for example).

Figure 4:
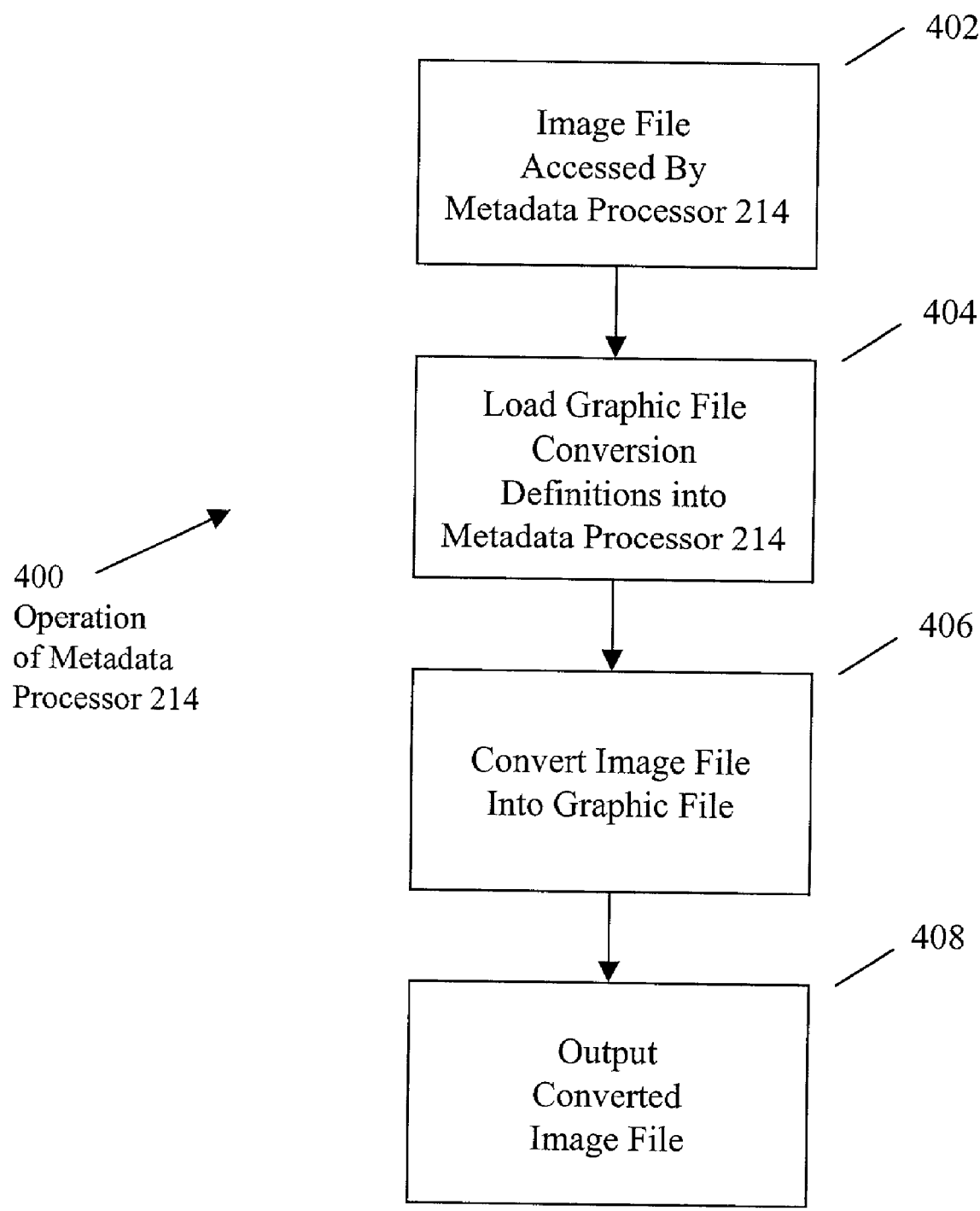
FIG. 4 is flow chart 400 of the operation of the metadata processor 214.

FIG. 4 is flow chart 400 of the operation of the metadata processor 214. At step 402 an image file is accessed by metadata preprocessor 214. The metadata preprocessor accesses metadata and places it in a predetermined format as may be specified by framework definition 110. Metadata may comprise graphics data, sound data, HTML data, video data, or any other type of data. Metadata preprocessor 214 processes the data and outputs the processed data in a transmission/multiplexer format. As shown in FIG. 4, the flow diagram allows the image file to be converted and output by the metadata processor 214 in real time. At step 404 the graphic file conversion definitions are loaded into the metadata preprocessor 214 to perform the conversion of the image file. At step 406 the image file 402 is converted into the graphic file in accordance with the definitions. At step 408 the metadata preprocessor 214 outputs the converted image file to the metadata packager 220. A high-speed processor may perform these functions in real time using definitions that can be quickly downloaded from a high-speed storage device. Custom designed state machines may also be employed for format conversion. Metadata preprocessor 214 may also be employed to convert the format of HTML metadata. HTML metadata may be sent to metadata processor 214 in HTML 4.0 format that then may be converted to HTML 3.2 format such as may be required by a display platform. The framework controller generates commands that are sent to metadata processor 214 that identify the metadata and specify the output format of the metadata.

Referring again to FIG. 2, video packager 218 and audio packager 220 are subsystems that package video and audio assets into a format that is compatible with the delivery system 112, including for example, packetization, serialization, rate control, null-packet insertion, and other functions required to prepare the video for compliant transport via MPEG, DVB-C/S/T, PacketVideo, or other transport formats. For example, General Instruments (now owned by Motorola) produces a QAM modulator that modulates MPEG video that is encoded from video preprocessor 210 to digital video broadcast (DVB) format. The framework controller generates commands that are sent to the QAM modulator specifying the frequency (channel) and PID (packet identifier) for the video based upon the framework definition that was provided for the omnimedia package.

As also shown in FIG. 2, metadata packager 222 is a subsystem that performs packaging on all metadata elements that are to be included in the omnimedia package. Metadata packaging may comprise rate control, packetization, serialization, and synchronization to video and/or audio streams. The metadata is also prepared for transport across any compliant transport mechanism (MPEG, DVB-C/S/T, PacketCable, DVB-MHP, etc.). A commercially available product for performing these functions is the TES3 that is provided by Norpak Corp., Kanata, Ontario. The TES3 encoder encodes metadata into a NTSC signal with NABTS encoding. NABTS is the protocol that allows metadata to be sent in the VBI (vertical blanking interval) of a NTSC signal. The framework controller commands the TES3 encoder as to what lines of the VBI are employed for transmitting metadata.

Referring again to FIG. 2, omnimenu generator 224 may be implemented as a rules-based subsystem employing framework definition 208 to generate a user-interface that presents program options and allows a viewer to select from these options. Rules may be employed to generate an omnimenu template in HTML page format. The HTML page may comprise a full screen image containing buttons (active icons) that may be selected to activate a particular media stream. Omnimenu generator 224 employs framework definition 208 to identify available streams and associates each stream with a button.

Figure 5:
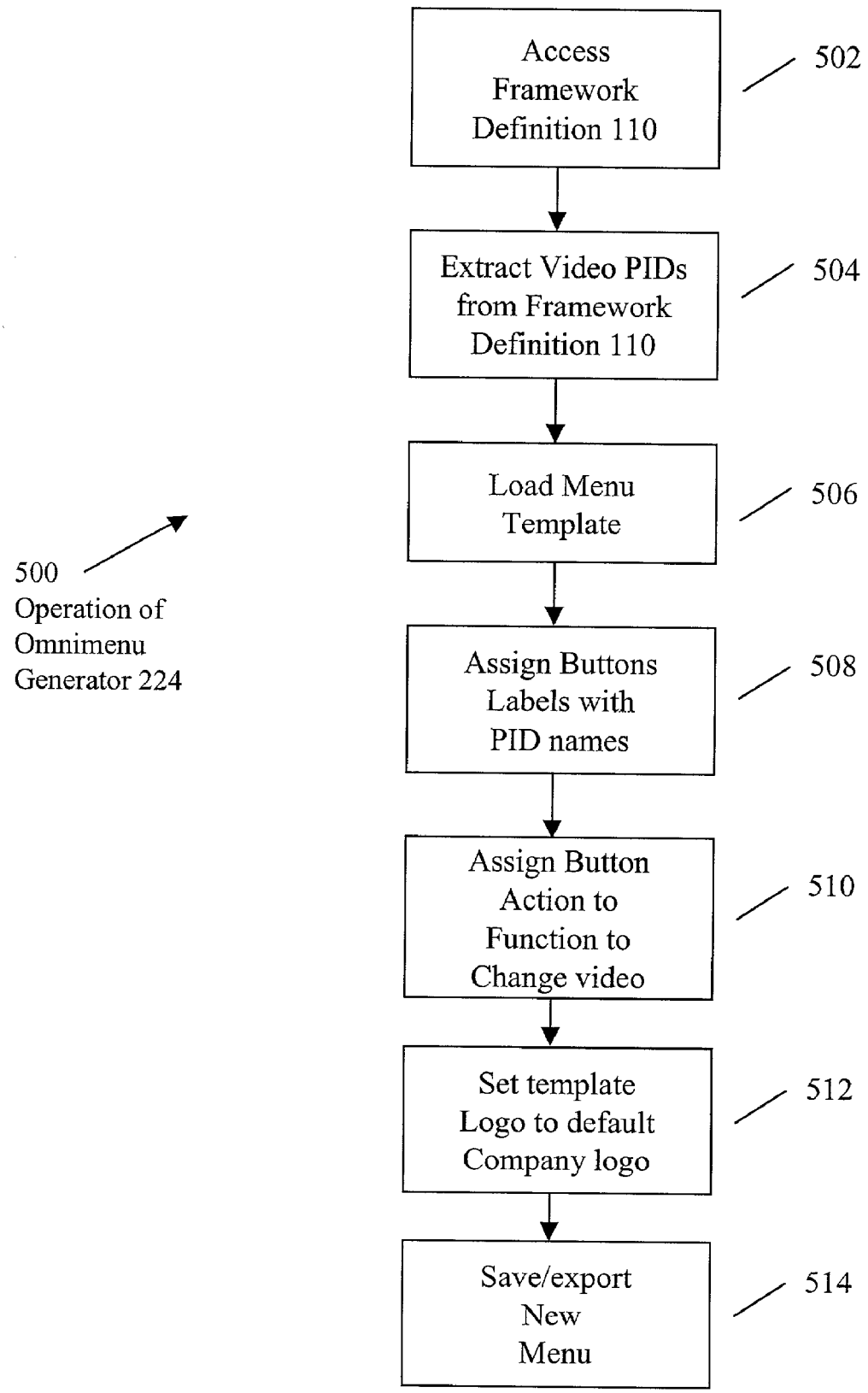
FIG. 5 is a flow chart 500 illustrating the operation of omnimenu generator 224.

FIG. 5 is a flow chart 500 illustrating the operation of omnimenu generator 224. At step 502, omnimenu generator 224 accesses the framework definition 110. At step 504, PIDS (program IDs) are extracted from the framework definition. The omnimenu template, described above, is loaded into the omnimenu generator 224 at step 506 of FIG. 5. At step 508, each of the PIDS that have been extracted from the framework definition are assigned to a button such that each of the buttons is labeled with the PID name. At step 510, selection functions are assigned to each of the buttons in accordance with the labels that have been assigned to those buttons. In this manner, the video can be changed in accordance with the labeled functions of each of the buttons of the template. At step 512 the template may be assigned a company logo. In this manner, the content may be properly branded to correspond to the source of that content. At step 514 the omnimenu generator 224 saves or exports the new omnimenu. The onmimenu may be exported to the package multiplexer 226.

As shown in FIG. 2, package multiplexer 226 combines the package elements into a stream or set of streams, in preparation for transmission. The streams are coupled through delivery system interface(s) 228, to delivery system 112, and the physical and logical interconnects to the transmission system. A Divicom, Inc., (Milpitas, Calif.) MUX is an example of a package multiplexer, having the different frequency and PIDs.

As indicated in FIG. 1, delivery system 112 then transports the streams to the receiver 114. Delivery system 112 may be analog or digital. In general, system delivery of content is as open as needed for any particular package and topology. A simple movie with no added content may be delivered on a single broadcast multiplex, while a package for the Super Bowl would contain many different delivery mechanisms. Some may be available on a particular receiver and not on others.

The omnimenu may provide a directory of available media for a broadcast event. The omnimenu is transmitted to a plurality of receivers 114. Receivers 114 may vary in capability and may include upstream (reverse path) communication from the receiver to the headend system, or may use other return systems such as an Internet connection, for example. Receivers 114 that do not include upstream communications may employ the omnimenu to select audio, video and metadata information contained in a broadcast stream. The bandwidth of an analog NTSC channel may be employed to carry several digital video streams, audio streams, and metadata. The omnimenu includes tuning or packet information to identify streams that may be accessed by the receiver. The receiver includes a software program operable to display the omnimenu and operable to tune and render selected streams.

In another embodiment of the present invention, receiver 114 supports upstream communications. The headend system, in response to upstream communications, may provide on-demand programming and data delivery. The omnimenu initiates upstream communication in response to user selection of a displayed media button (icon). The headend system may supply the requested stream in a broadcast channel, or if already broadcast, may provide tuning or packet decode information to the receiver. The requested stream may be employed to update the framework definition 110. Framework controller 108 uses the framework definition 110 to allocate bandwidth and PID information. The framework controller provides the frequency, PID and bandwidth information from the framework definition and uses it to send/control video and audio packager 218/220. Video packager 218 and audio packager 220 (FIG. 2) then allocate bandwidth for each of the respective video streams.

As also shown in FIG. 1, information from the framework controller 108 is encoded into the omnimenu so that the receiver will be able to tune to and decode the streams. The framework controller 108 may also include URL's for demand data or streaming media. Locations based on alternate tuner systems may also be included. For example, a radio station frequency having local commentary may be simulcast with the video. Depending of receiver 114 capability, some data and/or programming may be loaded in advance into storage built into the receiver such that the content is available locally for viewing during the airing of the primary content package. For example, all NFL player statistics may be preloaded over a trickle feed before the Super Bowl. In this manner, an interactive fantasy football application may retrieve all needed statistics during the game in order to let the viewer play a fantasy game during the airing of the primary program.

Figure 3:
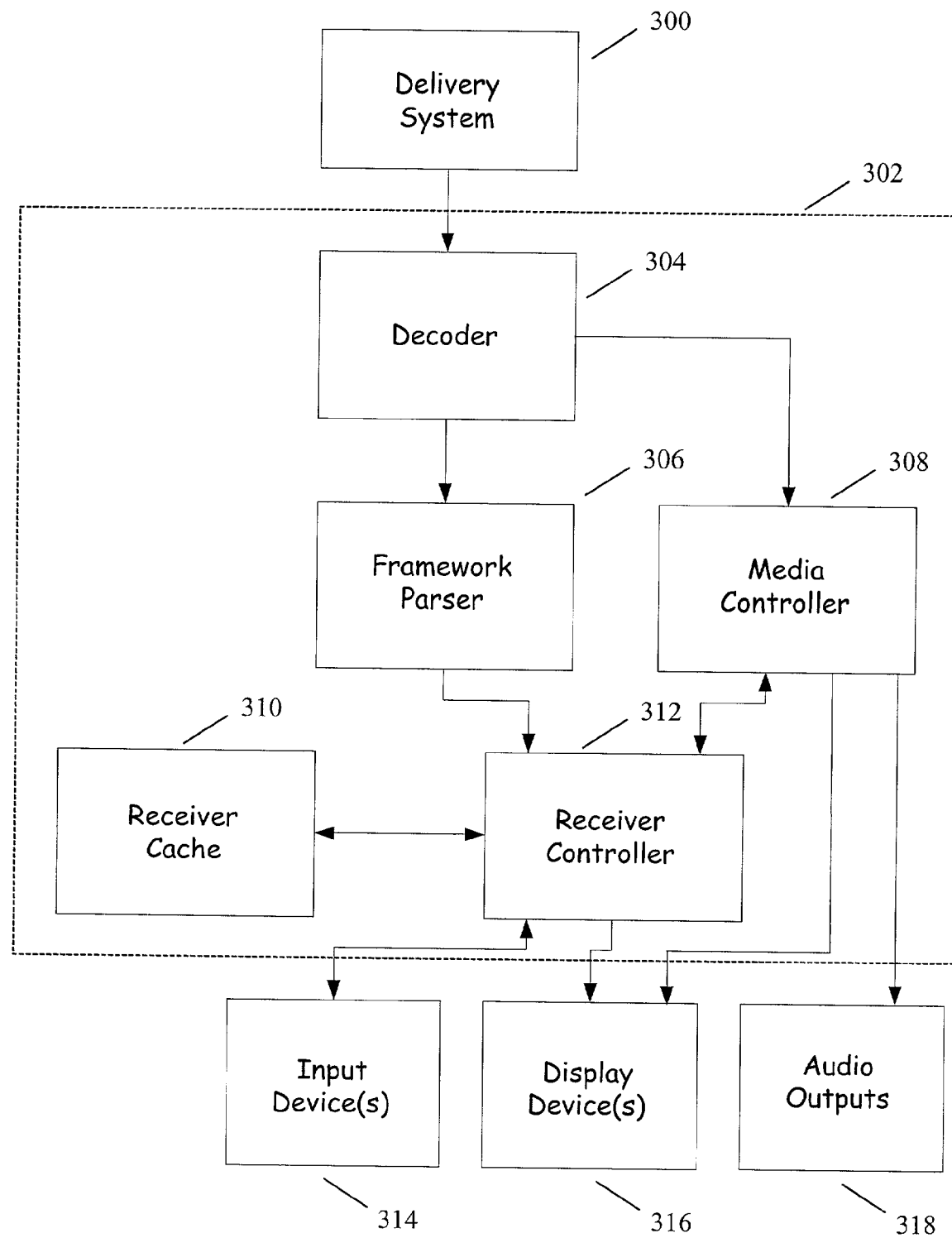
FIG. 3 depicts a receiver that may be employed with the present invention.

FIG. 3 depicts a receiver that may be employed in accordance with the present invention. Receiver 302 is used by the system end-user or viewer for use in viewing and controlling the omnimedia package. The receiver 302 may comprise a decoder 304, parser 306, media controller 308, receiver cache 310 and receiver controller 312. Decoder 304 may extract framework information from the delivery stream omnimenu. Information may be encoded in the vertical blanking interval. Decoder 304 may comprise a NABTS VBI decoder from ATI Technologies, Inc., of Thornhill, Ontario. The VBI decoder may extract data from the VBI and present it to framework parser 306. The data may comprise an XML format file of the omnimenu. Parser 306 extracts elements that comprise the framework. Framework parser 306 receives framework data from decoder 304 and prepares the data for use by the receiver controller 312. The receiver controller 312 may comprise a data interpretation module. Media controller 308 selects the media streams (audio, video and/or data) that are described by the framework definition. The media controller comprises 308 a tuner and video/audio decoder. The media controller 308 receives stream data from decoder 304 and control signals from receiver controller 312. Media controller 308 selects the proper media PIDS as needed and feeds them to display device(s) 116, audio device(s) 118, or user input device(s) 120. Receiver controller 312 serves as the central processor for the other elements of receiver 302. The receiver controller 312 may compare the capabilities of receiver 302 with the stream type to determine which streams may be received and used by receiver 302. Receiver controller 312 sends control signals to the other units in the system. The functions of receiver controller 312 may be performed by software resident in the control CPU of the receiver 302. Functions include receiving data from framework parser 306 and signaling media controller 308. For example, selection of omnimenu items may alter the framework such that the receiver controller 312 receives information from framework parser 306 and signals media controller 308 to render the selected media stream. Receiver cache 310 may be employed to store the framework definition and any parameters, code objects, data items or other software to control omnimenu display and response to user input.

Receiver 302 receives data associated with a content package and employs the data to access the package contents. Advanced receivers may check system capabilities to determine which pieces of content may be rendered. For example, a digital set top box may be able to decode MPEG video and audio. A digital set top box may also be able to decode MP3 audio, but not be able to decode HDTV signals. A radio type receiver may only be able to decode audio formats and, possibly, only formats not related to a video signal. The receiver may also be able to decode various data types from data services. These may take the form of application code that would be executed on the receiver if compatible. The receiver of the present invention has the internal compatibility to be able to receive the omnimedia packaged signal and decode the parts that are relevant to its capabilities to give the fullest experience it can, regardless of the format.

Referring again to FIG. 1, display device(s) 116 provide(s) the visual presentation of the framework to the end-user/viewer, including video, streaming media, a graphical user interface, static graphics, animated graphics, text, logos and other displayable assets. Similarly, audio output(s) 118 present(s) the audio portions of the framework to the end-user, including primary audio, possible secondary audio tracks, streaming media, audio feedback from the receiver 114, and other audio assets. User input device(s) 120 allow(s) the user to control the receiver and interact with the framework, providing the ability to choose components of the framework, select links within the framework, navigate the graphical user interface of the receiver, or perform other interactions with the receiver.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for producing a broadcast stream that contains various stream types of audio content, video content, and metadata content comprising:

creating a framework definition that identifies said various stream types in said audio content, said video content and said metadata content associated with a broadcast and attributes of said various stream types including the format of said various stream types;

comparing an audio format of said audio content with an audio transmission format and converting said audio content to said audio transmission format if said audio format and said audio transmission format differ;

comparing a video format of said video content with a video transmission format and converting said video content to said video transmission format if said video format and said video transmission format differ;

comparing a metadata format of said metadata content with a metadata transmission format and converting said metadata content to said metadata transmission format if said metadata format and said metadata transmission format differ;

creating a menu describing said audio content, said video content, and said metadata content;

combining said audio content, said video content, and said metadata content into a broadcast stream for transmission to a plurality of receivers that are capable of checking said various stream types to determine which streams of said various stream types may be used by said receivers;

transmitting said menu to a plurality of receivers that are capable of checking said stream type to determine which streams may be used by said receivers; and transmitting said broadcast stream.

2. The method of claim 1 wherein said step of creating a framework definition further comprises:

creating a framework definition record for each element of said audio content, said video content, and said metadata content wherein at least one framework definition record includes price information.

3. The method of claim 1 wherein said step of creating a menu further comprises:

representing each element of said audio content, said video content, and said metadata content with an icon; and assigning a logo to said menu.

4. The method of claim 1 wherein said step of converting metadata content further comprises:

determining if said metadata content is an image file.

5. The method of claim 4 wherein said step of converting said metadata content further comprises:

loading said image file;

loading a file conversion definition;

converting said file using said conversion definition; and outputting a converted image file.

* * * * *